United States Patent
Valencia Sil et al.

(10) Patent No.: US 7,745,381 B2
(45) Date of Patent: Jun. 29, 2010

(54) LUBRICANT FOR CONVEYING CONTAINERS

(75) Inventors: Arturo S. Valencia Sil, Naucalpan (MX); Lawrence A. Grab, Dusseldorf (DE); Bruce E. Schmidt, St Paul, MN (US); David A. Halsrud, Minneapolis, MN (US); Guang-Jong Jason Wei, Mendota Heights, MN (US); Eric D. Morrison, West Saint Paul, MN (US); Hector R. DiBenedetto, Pilar (AR); Jessica L. Anacker, Cottage Grove, MN (US); Richard D. Johnson, Saint Paul, MN (US); Megan W. Malvey, Roseville, MN (US); Scott P. Bennett, Stillwater, MN (US); Stefan Seemeyer, Hilden (DE)

(73) Assignee: Ecolab Inc., St. Paul, MN (US)

( * ) Notice: Subject to any disclaimer, the term of this patent is extended or adjusted under 35 U.S.C. 154(b) by 1176 days.

(21) Appl. No.: 11/351,863

(22) Filed: Feb. 10, 2006

(65) Prior Publication Data

US 2006/0211582 A1 Sep. 21, 2006

Related U.S. Application Data

(63) Continuation-in-part of application No. 11/080,000, filed on Mar. 15, 2005.

(51) Int. Cl.
*C10M 139/04* (2006.01)
(52) U.S. Cl. ............... 508/208; 508/202; 508/209; 508/412
(58) Field of Classification Search ........... 508/208, 508/412
See application file for complete search history.

(56) References Cited

U.S. PATENT DOCUMENTS

| | | | |
|---|---|---|---|
| 3,011,975 A | 12/1961 | Nitzsche et al. | |
| 3,213,024 A | 10/1965 | Blake | |
| 3,514,314 A | 5/1970 | Nemeth | |
| 3,664,956 A | 5/1972 | Messina | |
| 3,853,607 A | 12/1974 | Iyengar | |
| 3,981,812 A | 9/1976 | Zietz | |
| 4,062,785 A | 12/1977 | Nibert | |
| 4,065,590 A | 12/1977 | Salensky | |
| 4,069,933 A | 1/1978 | Newing | |
| 4,083,791 A | 4/1978 | Elliott | |
| 4,105,716 A | 8/1978 | Sakai | |
| 4,132,657 A | 1/1979 | Verdicchio | |
| 4,149,624 A | 4/1979 | Douty | |
| 4,162,347 A | 7/1979 | Montgomery | |
| 4,165,291 A | 8/1979 | Gragson | |
| 4,225,450 A | 9/1980 | Rosenberger | |
| 4,248,724 A | 2/1981 | MacIntosh | |
| 4,252,528 A | 2/1981 | Decker | |
| 4,262,776 A | 4/1981 | Wilson | |
| 4,264,650 A | 4/1981 | Schulze | |
| 4,274,973 A | 6/1981 | Stanton | |
| 4,289,671 A | 9/1981 | Hernandez | |
| 4,324,671 A | 4/1982 | Christian | |
| 4,343,616 A | 8/1982 | Decker | |
| 4,375,444 A | 3/1983 | Deeken | |
| 4,420,578 A | 12/1983 | Hagens et al. | |
| 4,436,200 A | 3/1984 | Hodlewski | |
| 4,478,889 A | 10/1984 | Maruhashi | |
| 4,486,378 A | 12/1984 | Hirata | |
| 4,515,836 A | 5/1985 | Cobbs, Jr. | |
| 4,525,377 A | 6/1985 | Nickel | |
| 4,534,995 A | 8/1985 | Pocock | |
| 4,538,542 A | 9/1985 | Kennon | |
| 4,543,909 A | 10/1985 | Sharpless | |
| 4,555,543 A | 11/1985 | Effenberger | |
| 4,569,869 A | 2/1986 | Kushida | |
| 4,573,429 A | 3/1986 | Cobbs, Jr. | |
| 4,604,220 A * | 8/1986 | Stanton | 508/179 |
| 4,632,053 A | 12/1986 | Villanueva | |
| 4,690,299 A | 9/1987 | Cannon | |
| 4,699,809 A | 10/1987 | Maruhashi | |
| 4,713,266 A | 12/1987 | Hasegawa | |
| 4,714,580 A | 12/1987 | Maruhashi | |
| 4,719,022 A | 1/1988 | Hyde | |
| 4,769,162 A | 9/1988 | Remus | |
| 4,828,727 A | 5/1989 | McAninch | |

(Continued)

FOREIGN PATENT DOCUMENTS

| | | |
|---|---|---|
| CA | 1157456 | 11/1983 |
| DE | 19942535 | 3/2001 |
| EP | 0359330 | 3/1990 |
| EP | 0844299 | 5/1998 |

(Continued)

OTHER PUBLICATIONS

*Dow Corning Emulsion* [Online] *1998*, XP002463027, URL: http://www2.dowcorning.com/DataFiles/090007c880001bdc.pdf, Dec. 19, 2007, 2 pages.

(Continued)

*Primary Examiner*—Glenn A Caldarola
*Assistant Examiner*—Taiwo Oladapo
(74) *Attorney, Agent, or Firm*—Merchant & Gould, P.C.

(57) ABSTRACT

A method for lubricating the passage of a conveyor comprising applying an undiluted lubricant composition through non-energized nozzles to at least a portion of the conveyor, the lubricant composition comprising a silicone emulsion and a water-miscible lubricant, the lubricant composition having a viscosity of less than 40 centipoise when measured using a Brookfield viscometer with an RV2 spindle at a spindle speed of 20 RPM and the lubricant composition being substantially free of a triethanolamine salt of dodecyl benzene sulfonic acid.

19 Claims, No Drawings

U.S. PATENT DOCUMENTS

| | | |
|---|---|---|
| 4,851,287 A | 7/1989 | Hartsing, Jr. |
| 4,855,162 A | 8/1989 | Wrasidlo |
| 4,867,890 A | 9/1989 | Colclough |
| 4,874,647 A | 10/1989 | Yatsu |
| 4,919,984 A | 4/1990 | Maruhashi |
| 4,929,375 A | 5/1990 | Rossio |
| 4,980,211 A | 12/1990 | Kushida |
| 4,995,993 A | 2/1991 | Papke |
| 5,001,935 A | 3/1991 | Tekkanat |
| 5,009,801 A | 4/1991 | Wider |
| 5,032,301 A | 7/1991 | Pawloski |
| 5,073,280 A | 12/1991 | Rossio |
| 5,104,559 A | 4/1992 | Pawloski |
| 5,115,047 A | 5/1992 | Hashimoto |
| 5,145,721 A | 9/1992 | Kojima |
| 5,160,646 A | 11/1992 | Scheld |
| 5,174,914 A | 12/1992 | Gutzmann |
| 5,182,035 A | 1/1993 | Schmidt |
| 5,202,037 A | 4/1993 | Lavelle |
| 5,238,718 A | 8/1993 | Yano et al. |
| 5,244,589 A | 9/1993 | Liu |
| 5,317,061 A | 5/1994 | Chu |
| 5,334,322 A | 8/1994 | Williams, Jr. |
| RE34,742 E | 9/1994 | Maier |
| 5,352,376 A | 10/1994 | Gutzmann |
| 5,371,112 A | 12/1994 | Sayre |
| 5,391,308 A | 2/1995 | Despo |
| 5,411,672 A | 5/1995 | Kagaya |
| 5,509,965 A | 4/1996 | Harry |
| 5,510,045 A | 4/1996 | Remus |
| 5,559,087 A | 9/1996 | Halsrud |
| 5,565,127 A | 10/1996 | Laufenberg |
| 5,573,819 A | 11/1996 | Nugent, Jr. |
| 5,652,034 A | 7/1997 | Seiner |
| 5,658,619 A | 8/1997 | Kirschner |
| 5,663,131 A | 9/1997 | Winicov |
| 5,670,463 A | 9/1997 | Maples |
| 5,672,401 A | 9/1997 | Anglin |
| 5,681,628 A | 10/1997 | Niederst |
| 5,698,269 A | 12/1997 | Carlblom |
| 5,721,023 A | 2/1998 | Ostapchenko |
| 5,723,418 A | 3/1998 | Person Hei |
| 5,728,770 A | 3/1998 | Yamamoto |
| 5,747,431 A | 5/1998 | Taylour |
| 5,783,303 A | 7/1998 | Tsuei |
| 5,789,459 A | 8/1998 | Inagaki |
| 5,863,874 A | 1/1999 | Person Hei |
| 5,871,590 A | 2/1999 | Hei |
| 5,876,812 A | 3/1999 | Frisk |
| 5,925,601 A | 7/1999 | McSherry |
| 5,932,526 A | 8/1999 | Person Hei |
| 5,935,914 A | 8/1999 | Theyssen |
| 5,952,601 A | 9/1999 | Sanford |
| 6,060,444 A | 5/2000 | Schulz |
| 6,087,308 A | 7/2000 | Butler |
| 6,096,692 A | 8/2000 | Hagihara |
| 6,207,622 B1 | 3/2001 | Li |
| 6,214,777 B1 | 4/2001 | Li |
| 6,288,012 B1 | 9/2001 | Li |
| 6,372,698 B1 | 4/2002 | Strothoff |
| 6,427,826 B1 | 8/2002 | Li |
| 6,495,494 B1 | 12/2002 | Li et al. |
| 6,509,302 B2 | 1/2003 | Li |
| 6,541,430 B1 | 4/2003 | Beatty |
| 6,569,816 B2 | 5/2003 | Oohira |
| 6,576,298 B2 | 6/2003 | Bennett |
| 6,653,263 B1 | 11/2003 | Küpper |
| 6,673,753 B2 | 1/2004 | Person Hei |
| 6,677,280 B2 | 1/2004 | Küpper |
| 6,688,434 B2 | 2/2004 | Johnson |
| 6,696,394 B1 | 2/2004 | Ruhr |
| 6,743,758 B2 | 6/2004 | Li |
| 6,780,823 B2 | 8/2004 | Li |
| 6,806,240 B1 | 10/2004 | Hei |
| 6,809,068 B1 | 10/2004 | Küpper |
| 6,821,568 B2 | 11/2004 | Bennett |
| 6,855,676 B2 | 2/2005 | Li et al. |
| 2002/0025912 A1 | 2/2002 | Person Hei et al. |
| 2003/0073589 A1 | 4/2003 | Li |
| 2003/0207040 A1* | 11/2003 | Bennett et al. .............. 427/421 |
| 2004/0029741 A1 | 2/2004 | Corby et al. |
| 2004/0058829 A1 | 3/2004 | Hei |
| 2004/0097382 A1 | 5/2004 | Li et al. |
| 2004/0102337 A1 | 5/2004 | Li |
| 2004/0235680 A1 | 11/2004 | Lawrence |

FOREIGN PATENT DOCUMENTS

| | | |
|---|---|---|
| GB | 1564128 | 4/1980 |
| JP | 57003892 | 1/1982 |
| JP | 6136377 | 5/1994 |
| JP | 7247293 | 9/1995 |
| JP | 7268380 | 10/1995 |
| JP | 10053679 | 2/1998 |
| JP | 10059523 | 3/1998 |
| JP | 2004217866 | 8/2004 |
| NL | 9300742 | 12/1993 |
| WO | WO96/08601 | 3/1996 |
| WO | WO98/51746 | 11/1998 |
| WO | WO01/07544 | 2/2001 |
| WO | WO01/12759 | 2/2002 |
| WO | WO02/20381 | 3/2002 |
| WO | WO03078557 | 9/2003 |
| WO | WO2006/009421 | 1/2006 |
| WO | WO2006/017503 | 2/2006 |
| WO | WO2007/040677 | 4/2007 |
| WO | WO2007/040678 | 4/2007 |

OTHER PUBLICATIONS

U.S. Appl. No. 11/233,596, filed Sep. 22, 2005, Morrison.
U.S. Appl. No. 60/149,095, filed Aug. 16, 1999, Hei.
U.S. Appl. No. 60/149,048, filed Aug. 16, 1999, Hei.
U.S. Appl. No. 09/619,261, filed Jul. 19, 2000, Corby.
U.S. Appl. No. 60/230,662, filed Sep. 7, 2000, Bennett.
International Search Report of EP03076178 dated Jun. 12, 2003, 2 pgs.
European Search Report of EP03076177 dated Jul. 17, 2003, 2 pgs.
Dupont, "Krytox® Dry Film Lubricants", Nov. 1997, 6 pgs.
Ecolab, "Lube Application to Conveyor Surface/Containers", Jun. 13, 2000, 7 pgs.
Interflon, "Fin Food Lube AL. High Penetration Teflon® Lubricating Agent Especially Suitable for Automatic Lubrication Systems for the Food Processing Industry", 1998, 20 pgs.
Interflon, "Maintenance Products with Teflon®", http://www.interflon.nl/engels.htm, Jun. 18, 1999, 10 pgs.
Moskala, E., "Environmental Stress Cracking in PET Beverage Containers", BEV-PAK Americas '96, Apr. 15-16, 1996, 14 pgs.
Moskala, E., "Environmental Stress Cracking in PET Carbonated Soft Drink Containers", Bev Tech 98, Mar. 30-Apr. 1, 1998, 22 pgs.
Synco Chemical Corporation, "Other Super Lube Products . . . What is Super Lube®?" http://www.super-lube.com, May 5, 1999, 5 pgs.
Tekkanat, B. et al., "Environmental Stress Cracking Resistance of Blow Molded Poly(Ethylene Terephthalate) Containers", Polymer Engineering and Science, vol. 32, No. 6, Mar. 1992, pp. 393-397, 5 pgs.
Gilbert, Peter, "*Conveyor Lubrication in Dairies, Breweries and Beverage Plants*", Klensan (Pty) Ltd., S.A. Food Review—Dec. 1981/Jan. 1982, pp. 27-28, 2 pages.
Gorton, Hugh J. Ph.D. and Taylour, Jim M. PhD. C Chem, "*The Development of New Conveyor Lubricant Technology*", MBAA Technical Quarterly, vol. 30, pp. 18-22, 1993, 5 pages.
US 5,863,871, 01/1999, Besse (withdrawn)

* cited by examiner

LUBRICANT FOR CONVEYING CONTAINERS

CROSS REFERENCE TO RELATED APPLICATION

This application is a continuation-in-part of U.S. patent application Ser. No. 11/080,000, filed Mar. 15, 2005, titled DRY LUBRICANT FOR CONVEYING CONTAINERS, the entire disclosure of which is incorporated herein by reference.

FIELD OF THE INVENTION

This invention relates to conveyor lubricants and to a method for conveying articles. The invention also relates to conveyor systems and containers wholly or partially coated with such lubricant compositions.

BACKGROUND

In commercial container filling or packaging operations, the containers typically are moved by a conveying system at very high rates of speed. Lubrication may be provided by diluting a concentrated lubricant composition with water to form an aqueous dilute lubricant solution (i.e., dilution ratios of 100:1 to 1000:1), and dispensing copious amounts of aqueous dilute lubricant solution to the conveyor or containers using spraying or pumping equipment or by using a undiluted or "dry lubricant." These lubricant compositions permit high-speed operation of the conveyor and limit marring of the containers or labels.

Conveyor lubricants are constantly evolving in an effort to meet increasing demands from filling and packaging plants. Specifically, the standards that conveyor lubricants have to meet in terms of (1) PET compatibility, (2) the environment surrounding a conveyor line, (3) cost of the lubricant composition and dispensing the lubricant composition, and the cost of using high amounts of water, and (4) the lubricant dispensing system complexity are becoming more rigorous. Silicone based conveyor lubricants have been seen as meeting some of the increased demands, however, there remains a need for even better silicone based conveyor lubricants that do not adversely affect the environment surrounding the conveyor line, that are cost effective from a composition and dispensing point of view, that are compatible with PET materials, and that are not difficult to dispense.

The compatibility of lubricant compositions with poly(ethylene terephthalate) (PET) is recognized as being important in the prior art both in aqueous dilute lubricants and dry lubricants. However, few prior art teachings measure PET compatibility in terms of bottle failure. What is important in regards to PET compatibility is that PET beverage bottles filled with carbonated beverages and exposed to conveyor lubricant solutions do not show failure under storage. By failure it is meant that the filled bottle bursts or leaks and the contents exit from the bottle. The important measure of the PET compatibility of a lubricant formula is the relative failure rate of bottles exposed to the lubricant. In most prior art publications, PET compatibility is judged by the visual appearance of bottles that have been contacted with lubricant solutions under conditions under which bottles typically do not fail. These prior art teachings assume a correlation exists between the visual appearance of bottles and failure rates when there is in fact no correlation between the appearance of bottles and bottle failure rates. Examples described in patent application Ser. No. 11/233,596, titled SILICONE LUBRICANT WITH GOOD WETTING ON PET SURFACES, and examples described in patent application Ser. No. 11/233,568 titled SILICONE CONVEYOR LUBRICANT WITH STOICHIOMETRIC AMOUNT OF AN ACID, present meaningful PET compatibility test results. In examples described in these two documents it is evident that there is no correlation between the visual appearance and the failure rate of bottles that have been contacted with lubricant compositions.

In some patents, PET compatibility is addressed in part by preferring that contact be avoided between the lubricant composition and portions of thermoplastic containers that are prone to stress cracking, for example the amorphous center base portion of the container. However, in actual practice, it is difficult to prevent lubricant compositions from contacting amorphous stress crack susceptible portions of the bottle and it is instead preferred that the lubricant have a high degree of PET compatibility as measured by a PET compatibility test that evaluates failure rate.

Silicone lubricants have been used on conveyors because they were believed to be PET compatible under the prior art understanding of PET compatibility as determined using a visual test as opposed to a failure test. Also, silicone lubricants were desirable because they provided adequate lubricity on conveyor surfaces. Silicone lubricants include a silicone material that is typically part of a silicone emulsion. In addition to the actual silicone material, a silicone emulsion also includes an emulsifier that allows the silicone raw material to go into solution when formulating. The emulsifier is often a surfactant, and it has been discovered in the present invention that some surfactants used in the emulsion may promote stress cracking in PET containers.

As previously discussed, conveyor lubricants may be used as both a diluted lubricant composition or an undiluted or "dry" lubricant composition. Diluted lubricants are advantageous because they are an effective way of lubricating conveyor surfaces while using less of the concentrated lubricant composition. On the other hand, dry lubricants are seen as advantageous because diluting lubricants with copious amounts of water is wasteful, environmentally unfriendly, and costly. The presence of wet surfaces and standing water provides a medium for the growth of microorganisms including bacteria, yeast, and mold. Puddles of excess lubricant solution on floors create a hazard for slipping and falling. By requiring dilution of the concentrated lubricant, dilution errors can occur, leading to variations and errors in the concentration of the aqueous dilute lubricant solution. Dilution of concentrated lubricant compositions on a conveyor line requires use of equipment that increases system complexity, requires additional maintenance, and may fail or function incorrectly. Water used for dilution of concentrated lubricant solutions on site can cause environmental stress cracking of poly(ethylene terephthalate) (PET) bottles. In addition to issues of increased cost, environmental impact, hazards associated with wet surfaces, increased system complexity, and risk of environmental stress cracking, the practice of diluting lubricant solutions at the point of use gives an unsightly and unclean appearance.

"Dry lubes" have been described in the past as a solution to the disadvantages of dilute aqueous lubricants. A "dry lube" historically has referred to a lubricant composition with less than 50% water that was applied to a container or a conveyor without dilution. Methods of applying conveyor lubricants without in line dilution are described, for example, in U.S. Pat. Nos. 6,288,012; 6,427,826; 6,485,794; 6,495,494; 6,509,302; 6,576,298; 6,673,753; 6,780,823; 6,806,240; 6,821,568; U.S. Patent Applications 2004/0029741A1 and 2005/0003973A1; and PCT Patent Application 01/07544.

In spite of the advantages of "dry lubes" and many efforts to utilize them, practice of conveyor lubricant methods which utilize lubricants in a neat form without dilution are not widely practiced and are generally not practiced in connection with PET bottles that are prone to stress cracking. For practical application of "dry lube" technology with PET bottles, two features which have not been found together in the prior art must be provided simultaneously: acceptable PET compatibility of the lubricant composition and practical means of dispensing.

Practical dispensing of conveyor lubricants requires careful control and maintenance of optimal coefficient of friction values between package and conveyor surfaces, as expressed as a coefficient of friction, sliding force, slip value, frictional resistance or similar term. Generally, the objective for lubricant composition formulation and dispensing in prior art patents and published records is to produce the lowest possible coefficient of friction between conveyed packages and conveyor surfaces. In practice this does not result in effective conveying. In a practical implementation of a conveyor lubrication program, it is in fact insufficient to produce the lowest possible coefficient of friction between conveyed packages and conveyor surfaces. Over application of lubricant compositions and unacceptably low coefficient of friction between packages and the conveyor surface can result in decreased system efficiency up to and including complete inability to transport packages. In the case of packages with height to width ratios much greater than 1, such as bottles, an unacceptably low coefficient of friction may result in an excessive number of tipped and fallen bottles. It is preferred to maintain a proper value for the coefficient of friction that is not necessarily the minimum possible value. Within the same conveyor line, the optimum coefficient of friction is different at different locations on the track. For example, lower coefficient of friction values between packages and conveyor surfaces may be required in faster moving portions of the conveyor such as where packages are being conveyed at a high speed in single file or in transition areas where packages move from single file lines to columns that are several packages wide. Higher coefficient of friction values between packages and conveyor surfaces may be required near the end of conveyor lines to provide sufficient back pressure and forward motive force where packages are finally urged into trays, boxes, cartons or the like. It is highly desirable that the lubricant dispensing system be able to provide different values for the coefficient of friction at different locations on the same conveyor line without requiring different concentrations of lubricant. The capability to provide different coefficient of friction values at different conveyor locations with the same lubricant composition is especially important in the case that the lubricant is not diluted with water at the point of use. Different coefficient of friction values at different conveyor locations is necessarily provided by varying lubricant dispensing system parameters such as the volume of lubricant composition dispensed per area per time.

Several patents acknowledge a preference to minimize lubricant use amounts for reasons of cost. For example, U.S. Patent Application 2004/0029741 states that "Dispensing equipment developed for dosing the liquid composition of the invention has been designed to apply the liquid directly to the surface of the conveyor belt. Since relatively expensive neat product is applied, this equipment has been developed such that any spillage of liquid material (e.g. by flowing under gravity away from the treated surface or dripping down onto the floor) is avoided so as to minimize wastage of said liquid." A dispensing device recommended in U.S. Patent Application 2004/0029741 is a so-called "flicker" non contact applicator. U.S. Pat. No. 6,382,524 pertains to a "flicker" applicator for applying lubricants which comprises a cylindrical brush that is rotatably mounted in a frame and transfers lubricant from a pick up roller to a conveyor surface by a "flicking action." U.S. Pat. No. 6,688,434 also states a preference to minimize lubricant use amounts for reasons of cost and waste. According to U.S. Pat. No. 6,688,434 "if too little lubricant composition is sprayed, it is expected that there will be insufficient lubricity between the conveyor and the items being transported on the conveyor. If too much of the lubricant composition is sprayed, it is expected that there will be some waste and increased cost." U.S. Pat. No. 6,688,434 describes an elaborate dispensing apparatus in which gaseous pressure is used to evenly distribute lubricant through a system of high pressure lubricant lines, nozzles, nozzle valves, and spray valves and to actuate individual spray valves. Other patents describe other lubricant dispensing approaches. For example, U.S. Pat. No. 6,102,161 describes a dispensing device in which a liquid lubricant composition soaks a felt cloth which rests on a conveyor surface and is transferred to the conveyor by contact. U.S. Pat. No. 6,576,298 describes apparatus to generate finely divided droplets or particulates of lubricants by contacting a lubricant flow with an air flow. Dispensing systems according to U.S. Pat. No. 6,576,298 describe separate subsystems for the distribution of compressed air and lubricant composition throughout the conveyor system.

Although prior art patents describe equipment that is capable of applying conveyor lubricant compositions with reduced dripping and waste, they do so with apparatus that are too complex and elaborate. Furthermore, prior art methods seek only to minimize use amounts of lubricant compositions and do not teach methods that are effective to provide different values for the coefficient of friction at different locations.

It is against this background that the present invention has been made.

SUMMARY OF THE INVENTION

Surprisingly, it has been discovered that some silicone emulsions do not promote stress cracking in PET containers while other silicone emulsions actually promote stress cracking in silicone emulsions. This is unexpected because it has been thought that most silicone emulsions were very similar. However, when various silicone emulsions were tested on PET bottles, it was observed that some silicone emulsions clearly caused bottle failure where others did not.

Specifically, it has been discovered, that silicone emulsions where the triethanolamine salt of an alkyl benzene sulfonic acid (TEA ABSA) where the alkyl is a linear or branched unsubstituted alkyl group is part of the silicone emulsion promote stress cracking in PET. Triethanolamine salts of alkyl benzene sulfonic acids are anionic surfactants sometimes included as emulsifiers in silicone emulsions.

Accordingly, the present invention is generally directed to a silicone conveyor lubricant and methods of lubricating a conveyor using a silicone conveyor lubricant where the silicone emulsion does not promote stress cracking in PET containers. In some embodiments, the silicone conveyor lubricant uses a silicone emulsion that does not contain TEA ABSA compounds or includes TEA ABSA compounds in small amounts. In some embodiments, the silicone conveyor lubricant has less than 500 ppm of TEA ABSA compounds. In some embodiments, the silicone conveyor lubricant is substantially free of TEA ABSA compounds. In some embodiments, the silicone conveyor lubricant is substantially free of anionic surfactant.

In some embodiments, the silicone lubricants of present invention may have greater than 50% water. In some embodiments, the present invention may have less than 50% water. In some embodiments, the present invention can be applied by spraying using non-energized nozzles. In some embodiments, the present invention provides, in one aspect, a method for lubricating the passage of a container along a conveyor comprising applying a lubricant composition containing a water-miscible silicone material to at least a portion of the container contacting surface of the conveyor or to at least a portion of the conveyor-contacting surface of the container, wherein the concentration of triethanolamine salts of alkyl benzene sulfonic acid (TEA ABSA) compounds in the composition is less than about 500 ppm.

In some embodiments, the present invention is directed to a silicone lubricant that is not diluted prior to applying it to a conveyor or container surface. In some embodiments, the present invention is directed to a method of applying an undiluted lubricant intermittently. In some embodiments, the present invention is directed to a "universal" lubricant that may be used with a variety of container and conveyor materials.

In some embodiments, the present invention is directed to a method of lubricating an entire conveyor where the silicone lubricant is used on a conveyor but applied at different rates (i.e. quantity of lubricant dispensed per area per time) depending on the location on the conveyor.

In some embodiments, the lubricant mixture also comprises a water miscible lubricant. In some embodiments, the water-miscible lubricant is selected from the group consisting of a phosphate ester, an amine, and an amine derivative. In some embodiments, the water-miscible lubricant is a traditional glass or metal lubricant.

DETAILED DESCRIPTION

Definitions

For the following defined terms, these definitions shall be applied, unless a different definition is given in the claims or elsewhere in this specification.

All numeric values are herein assumed to be modified by the term "about," whether or not explicitly indicated. The term "about" generally refers to a range of numbers that one of skill in the art would consider equivalent to the recited value (i.e., having the same function or result). In many instances, the term "about" may include numbers that are rounded to the nearest significant figure.

Weight percent, percent by weight, % by weight, wt %, and the like are synonyms that refer to the concentration of a substance as the weight of that substance divided by the weight of the composition and multiplied by 100.

The recitation of numerical ranges by endpoints includes all numbers subsumed within that range (e.g. 1 to 5 includes 1, 1.5, 2, 2.75, 3, 3.80, 4 and 5).

As used in this specification and the appended claims, the singular forms "a," "an," and "the" include plural referents unless the content clearly dictates otherwise. Thus, for example, reference to a composition containing "a compound" includes a mixture of two or more compounds. As used in this specification and the appended claims, the term "or" is generally employed in its sense including "and/or" unless the content clearly dictates otherwise.

Compositions

As previously discussed, the present invention is generally directed to silicone lubricant compositions that contain a silicone emulsion that has less than 500 ppm of TEA ABSA compounds. In some embodiments, the silicone emulsion is free of TEA ABSA compounds, and in some embodiments, the silicone emulsion is free of anionic surfactants. Triethanolamine salts of alkyl benzene sulfonic acids including triethanolamine dodecyl benzene sulfonic acid (TEA DDBSA) are common emulsifiers which provide excellent emulsion stability, resistance to creaming, and freeze-thaw stability in silicone emulsions. However, in the case of lubricant compositions and especially substantially aqueous lubricant composition which comprise silicone emulsions, TEA ABSA compounds decrease the PET compatibility of the lubricant. In particular, silicone emulsion containing lubricant compositions with TEA ABSA compound concentrations above about 500 ppm will cause relatively greater risk of stress cracking. The reason that presence of TEA ABSA compounds cause a loss of compatibility is unknown. The finding that PET compatibility is reduced by the presence of TEA ABSA compounds is remarkable because TEA ABSA compounds in part and in whole have been patented numerous times as "stress crack inhibitors" for poly(alkylene terephthalate) articles including carbonated beverage bottles. Hydrophilic substituted aromatic hydrocarbons with alkyl side chains including alkyl benzene sulfonate salt compounds are claimed as "stress crack inhibitors" for poly(alkylene terephthalate) polymers in U.S. Pat. No. 5,009,801. Amines having at least six carbon atoms including triethanolamine and mixtures of amines and alkyl substituted aryl sulfonates are claimed as "stress crack inhibitors" for poly(alkylene terephthalate) polymers including PET beverage bottles in U.S. Pat. No. 5,073,280. According to U.S. Pat. No. 5,223,162, amines including triethanolamine are useful as additional stress crack inhibitors for poly(alkylene terephthalate) articles in caustic aqueous bottle washing solutions containing alkyl substituted aryl sulfonate compound primary stress crack inhibitors. In U.S. Patent Application 2004/0029741 A1, it is stated that "anionic surfactants may improve the PET compatibility of a liquid composition containing a polyhydridic alcohol such as glycerine." According to U.S. Patent Application 2004/0029741 A1, examples of suitable anionic surfactants include ammonium salts of alkylbenzene sulfonates having from 10 to 18 carbon atoms in the alkyl group.

Silicone emulsions include emulsions formed from silicone materials such as methyl(dimethyl), higher alkyl and aryl silicones and functionalized silicones such as chlorosilanes, amino-, methoxy-, epoxy- and vinyl-substituted siloxanes, and silanols. Useful silicone emulsions contain no triethanolamine salts of alkyl benzene sulfonic acid (TEA ABSA) compounds or sufficiently small concentrations of TEA ABSA compounds such that the concentration of TEA ABSA compounds in the final lubricant composition is less than about 500 ppm. Whether or not TEA ABSA compounds are present, suitable silicone emulsions preferably contain emulsifiers other than TEA ABSA compounds. Preferred emulsifiers used in the preparation of silicone emulsions include nonionic surfactants such as linear and branched alkyl phenol ethoxylates, linear and branched primary alcohol ethoxylates, linear and branched secondary alcohol ethoxylates, poly alkylene oxide modified polydimethylsiloxanes, sorbitan derivatives such as polyoxyethylene sorbitan mono oleate and sorbitan monolaurate; anionic surfactants such as sodium alkyl aryl polyether sulfonate compounds and sodium alkyl aryl sulfonate compounds; and cationic surfactants such as trimethyl ammonium salts. Examples of preferred emulsifiers for silicone emulsions include members of the Surfonic L series, Surfonic N series, Surfonic OP series, Ecoteric T series, and Nansa SS series from Huntsman Chemical, Houston Tex.; members of the Tergitol NP series, Triton X series, Tergitol TMN series, and Tergitol 15-S series from Dow Chemical Company, Midland Mich.; Tomadol surfactant products from Tomah3 Products, Inc., Milton, Wis.; members of the Arlacel and Tween series from Uniqema, New Castle Del.; members of the Silwet series from GE Silicones, Wilton N.Y.; members of the Abil series surfactants from Goldschmidt Personal Care, Hopewell, Va.; members of the Arquad series surfactants from Akzo Nobel Chemicals, Inc., Chicago Ill.; and equivalent products.

Suitable silicone emulsions made using preferred emulsifiers include E2175 high viscosity polydimethylsiloxane (a 60% siloxane emulsion commercially available from Lambent Technologies, Inc.), E2140 polydimethylsiloxane (a 35% siloxane emulsion commercially available from Lambent Technologies, Inc.), E2140 FG food grade intermediate viscosity polydimethylsiloxane (a 35% siloxane emulsion commercially available from Lambent Technologies, Inc.), Dow Corning HV600 Emulsion (a non-ionic 55% trimethylsilyl terminated polydimethylsiloxane dispersion available from Dow Corning), Dow Corning 1664 Emulsion (a non-ionic 50% trimethylsilyl terminated polydimethylsiloxane dispersion available from Dow Corning), Dow Corning 1101 (an anionic, 50% active emulsion based on silanol terminated high viscosity polydimethylsiloxane available from Dow Corning), Dow Corning 346 (a non-ionic, 60% active trimethylsilyl terminated polydimethylsiloxane emulsion available from Dow Corning, Midland Mich.), GE SM 2068A (an anionic 35% silanol terminated polydimethylsiloxane dispersion available from General Electric Silicones, Wilton N.Y.), GE SM 2128 (a non-ionic 35% trimethylsilyl terminated polydimethylsiloxane dispersion available from General Electric Silicones), GE SM 2135 (a non-ionic 50% trimethylsilyl terminated polydimethylsiloxane dispersion available from General Electric Silicones), GE SM 2138 (a non-ionic 60% silanol terminated polydimethylsiloxane dispersion available from General Electric Silicones), GE SM 2140 (a non-ionic 50% trimethylsilyl terminated polydimethylsiloxane dispersion available from General Electric Silicones), GE SM 2154 (a non-ionic 50% methylhexylisopropylbenzyl siloxane dispersion available from General Electric Silicones), GE SM 2162 (a non-ionic 50% trimethylsilyl terminated polydimethylsiloxane dispersion available from General Electric Silicones), GE SM 2163 (a non-ionic 60% trimethylsilyl terminated polydimethylsiloxane dispersion available from General Electric Silicones), GE SM 2167 (a cationic 50% trimethylsilyl terminated polydimethylsiloxane dispersion available from General Electric Silicones), GE SM 2169 (a non-ionic 60% trimethylsilyl terminated polydimethylsiloxane dispersion available from General Electric Silicones), GE SM 2725 (an anionic 50% silanol terminated polydimethylsiloxane dispersion available from General Electric Silicones), KM 901 (a non-ionic 50% trimethylsilyl terminated polydimethylsiloxane dispersion available from Shin-Etsu Silicones of America, Inc. Akron, Ohio), Fluid Emulsion E10 (a nonionic 38% silicone emulsion available from Wacker silicones, Adrian, Mich.), Fluid Emulsion E1044 (a nonionic 39% silicone emulsion available from Wacker silicones, Adrian, Mich.), KM 902 (a non-ionic 50% trimethylsilyl terminated polydimethylsiloxane dispersion available from Shin-Etsu Silicones of America, Inc. Akron, Ohio), and equivalent products. Preferred silicone emulsions typically contain from about 30 wt. % to about 70 wt. % water. Non-water-miscible silicone materials (e.g., non-water-soluble silicone fluids and non-water-dispersible silicone powders) can also be employed in the lubricant if combined with a suitable emulsifier (e.g., nonionic, anionic or cationic emulsifiers). Care should be taken to avoid the use of emulsifiers or other surfactants that promote environmental stress cracking in plastic containers.

Polydimethylsiloxane emulsions are preferred silicone materials.

In addition to the silicone emulsion, the lubricant composition can contain additional functional ingredients if desired. For example, the compositions can contain water miscible lubricants, hydrophilic diluents, antimicrobial agents, stabilizing/coupling agents, detergents and dispersing agents, anti-wear agents, viscosity modifiers, sequestrants, corrosion inhibitors, film forming materials, antioxidants or antistatic agents. The amounts and types of such additional components will be apparent to those skilled in the art. Care should be taken to avoid the use of functional ingredients that might promote environmental stress cracking in plastic containers when evaluated using the PET Stress Crack Test set out below.

Water-Miscible Lubricants

A variety of water-miscible lubricants can be employed in the lubricant compositions, including hydroxy-containing compounds such as polyols (e.g., glycerol and propylene glycol); polyalkylene glycols (e.g., the CARBOWAX™ series of polyethylene and methoxypolyethylene glycols, commercially available from Union Carbide Corp.); linear copolymers of ethylene and propylene oxides (e.g., UCON™ 50-HB-100 water-soluble ethylene oxide:propylene oxide copolymer, commercially available from Union Carbide Corp.); and sorbitan esters (e.g., TWEEN™ series 20, 40, 60, 80 and 85 polyoxyethylene sorbitan monooleates and SPAN™ series 20, 80, 83 and 85 sorbitan esters, commercially available from ICI Surfactants). Other suitable water-miscible lubricants include phosphate esters, amines and their derivatives such as amine salts and fatty amines, and other commercially available water-miscible lubricants that will be familiar to those skilled in the art. Derivatives (e.g., partial esters or ethoxylates) of the above lubricants can also be employed. Examples of suitable phosphate ester lubricants include polyethylene phenol ether phosphate and those phosphate esters described in U.S. Pat. No. 6,667,283, which is incorporated by reference herein in its entirety. Examples of suitable amine or amine derivative lubricants include oleyl diamino propane, coco diamino propane, lauryl propyl diamine, dimethyl lauryl amine, PEG coco amine, alkyl $C_{12}$-$C_{14}$ oxy propyl diamine, and those amine compositions described in U.S. Pat. Nos. 5,182,035 and 5,932,526, both of which are incorporated by reference herein in their entirety. Preferably the water-miscible lubricants include linear copolymers of ethylene and propylene oxides, fatty amine salts and alcohol ethoxylates and derivatives thereof.

Hydrophilic Diluents

Suitable hydrophilic diluents include alcohols such as isopropyl alcohol, polyols such as ethylene glycol and glycerin, ketones such as methyl ethyl ketone, and cyclic ethers such as tetrahydrofuran. If hydrophilic diluents are used, care must be taken not to increase the lubricant composition viscosity to greater than about 40 centipoises when measured using a Brookfield viscometer with an RV2 spindle at a speed of 20 RPM.

Antimicrobial Agents Antimicrobial agents can also be added. Some useful antimicrobial agents include disinfectants, antiseptics, and preservatives. Some non-limiting examples include phenols including halo- and nitrophenols and substituted bisphenols such as 4-hexylresorcinol, 2-benzyl-4-chlorophenol and 2,4,4'-trichloro-2'-hydroxydiphenyl ether; organic and inorganic acids and corresponding esters and salts such as dehydroacetic acid, peroxycarboxylic acids, peroxyacetic acid, peroxyoctanoic acid, methyl p-hydroxy benzoic acid; cationic agents such as quaternary ammonium compounds; amine or amine salts such as oleyl diamino propane diacetate, coco diamino propane diacetate, lauryl propyl diamine diacetate, dimethyl lauryl ammonium acetate; isothiazolinone compounds such as 2-methyl-4-isothiazolin-3-one and 5-chloro-2-methyl-4-isothiazolin-3-one; phosphonium compounds such as tetrakishydroxymethyl phosphonium sulphate (THPS), aldehydes such as glutaraldehyde, antimicrobial dyes such as acridines, triphenylmethane dyes and quinines; and halogens including iodine and chlorine compounds. The antimicrobial agents can be used in amounts to provide the desired antimicrobial properties. In some examples, the amount can range from 0 to about 20 wt.-% of the total composition.

Stabilizing/Coupling Agents

In a lubricant composition, stabilizing agents, or coupling agents can be employed to keep the concentrate homogeneous, for example, under cold temperature. Some of the ingredients may have the tendency to phase separate or form layers due to the high concentration. Many different types of compounds can be used as stabilizers. Examples are isopropyl alcohol, ethanol, urea, octane sulfonate, and glycols such as hexylene glycol, propylene glycol and the like. The stabilizing/coupling agents can be used in an amount to give desired results. This amount can range, for example, from about 0 to about 30 wt.-% of the total composition.

Detergents/Dispersing Agents

Detergents of dispersing agents may also be added. Some examples of detergents and dispersants include alkyl benzene sulfonic acid, alkylphosphonic acids, and their calcium, sodium, and magnesium salts, polybutenylsuccinic acid derivatives, silicone surfactants, fluorosurfactants, and molecules containing polar groups attached to an oil-solubilizing aliphatic hydrocarbon chain.

Some examples of suitable dispersing agents include alkoxylated fatty alkyl monoamines and diamines such as coco bis (2-hydroxyethyl)amine, polyoxyethylene (5)-coco amine, polyoxyethylene(15)coco amine, tallow bis(-2hydroxyethyl)amine, polyoxyethylene(15)amine, polyoxyethylene(5)oleyl amine and the like.

The detergent and/or dispersants can be used in an amount to give desired results. This amount can range, for example, from about 0 to about 30 wt.-% of the total composition.

Anti-wear Agents

Anti-wear agents can also be added. Some examples of anti-wear agents include zinc dialkyl dithiophosphates, tricresyl phosphate, and alkyl and aryl disulfides and polysulfides. The anti-wear and/or extreme pressure agents are used in amounts to give the desired results. This amount can range, for example, from 0 to about 20 wt.-% of the total composition.

Corrosion Inhibitors

Useful corrosion inhibitors include polycarboxylic acids such as short chain carboxylic diacids, triacids, as well as phosphate esters and combinations thereof. Useful phosphate esters include alkyl phosphate esters, monoalkyl aryl phosphate esters, dialkyl aryl phosphate esters, trialkyl aryl phosphate esters, and mixtures thereof such as Emphos PS 236 commercially available from Witco Chemical Company. Other useful corrosion inhibitors include the triazoles, such as benzotriazole, tolyltriazole and mercaptobenzothiazole, and in combinations with phosphonates such as 1-hydroxyethylidene-1, 1-diphosphonic acid, and surfactants such as oleic acid diethanolamide and sodium cocoamphohydroxy propyl sulfonate, and the like. Useful corrosion inhibitors include polycarboxylic acids such as dicarboxylic acids. The acids which are preferred include adipic, glutaric, succinic, and mixtures thereof. The most preferred is a mixture of adipic, glutaric, and succinic acid, which is a raw material sold by BASF under the name SOKALAN™ DCS.

The lubricant composition is preferably a liquid at the time of application. The lubricant composition preferably has a viscosity that will permit it to be pumped and readily applied to a conveyor or containers, and that will facilitate rapid film formation whether or not the conveyor is in motion. The lubricant composition can be formulated so that it exhibits shear thinning or other pseudo-plastic behavior, manifested by a higher viscosity (e.g., non-dripping behavior) when at rest, and a much lower viscosity when subjected to shear stresses such as those provided by pumping and spraying. However, it is preferable that whether shear thinning or not, the lubricant composition has a low viscosity at low shear rates. In the case of applying a lubricant composition intermittently, there is difficulty in achieving sufficient pressure throughout the lubricant distribution system. The difficulty is related to the viscosity of the lubricant composition and the distance between the lubricant pressure source and the extremities of the lubricant distribution system. For example, as distances in the lubricant distribution system increase, it is difficult to provide a rapid increase in pressure at the dispensing nozzles that triggers the spray pattern and a rapid decrease in pressure that shuts off flow. The transmission of pressure in the lubricant line from the lubricant source to the spray nozzle is impeded by high lubricant viscosity, and specifically high lubricant viscosity at low shear rates. Prior art solutions to this problem were typically mechanical in nature and included the use of high pressures and elaborate dispensing apparatus.

Low lubricant viscosity is important to achieve acceptable spray patterns from non-energized nozzles at pressures less than 80 psi. Energized nozzles refer to nozzles where the lubricant stream is broken into a spray of fine droplets by the use of energy, which may include high pressures, compressed air, or sonication to deliver the lubricant. An example of a preferable non-energized nozzle is a Low Flow FloodJet 1/8K-SS.25 nozzle (available from Spraying Systems, Wheaton Ill.). Preferably the lubricant dispensing system operates at a pressure less than about 60 psi. Higher pressures pose a greater problem of leakage, particularly in the case where plastic tubing is used for the lubricant distribution lines. It also requires additional equipment system capabilities to operate with higher pressures, for example high pressure lubricant lines, spray valves, and lubricant venting lines. For proper dispensing with non-energized nozzles such as Low Flow FloodJet 1/8K-SS.25 nozzles at pressures less than 60 psi, it is preferred that the lubricant viscosity be less than about 40 centipoises. Preferred lubricants have a viscosity less than about 40 centipoises, less than 25 centipoises, and less than 15 centipoises when measured using a Brookfield viscometer with an RV2 spindle at a speed of 20 RPM. Preferred lubricant dispensing system pressures are 5-80 psi, 20-60 psi, and 25-50 psi.

Preferred amounts for the silicone material, water miscible lubricant and water or hydrophilic diluent are about 0.0015% to about 50 wt. % of the silicone material (exclusive of any water or other hydrophilic diluent and emulsifier that may be present if the silicone material is, for example, a silicone emulsion), about 0 to about 20 wt. % of the water miscible lubricant, and about 50 to about 99.999 wt. % of water or hydrophilic diluent. More preferably, the lubricant composition contains about 0.0075 to about 20 wt. % of the silicone material, about 0.0010% to about 15 wt. % of the water miscible lubricant, and about 65 to about 99.99 wt. % of water or hydrophilic diluent. Most preferably, the lubricant composition contains about 0.045% to about 7 wt. % of the silicone material, about 0.006 to about 10 wt. % of the hydrophilic lubricant, and about 85 to about 99.95 wt. % of water or hydrophilic diluent.

Preferred lubricant compositions are substantially aqueous, that is, the major constituent is water. The use of water as a vehicle for lubricant compositions is capable to provide viscosity that is sufficiently low, i.e. less than about 40 centipoises when measured using a Brookfield viscometer with an RV2 spindle at a speed of 20 RPM, so as to enable dispensing by simple lubricant distribution systems operating at low pressures using non-energized nozzles. In the case that lubricant compositions are substantially aqueous, care must be taken to insure the PET compatibility of the composition. By "compatible with PET" or "PET compatibility", it is meant that PET bottles filled with a carbonated liquid will show a relatively lower failure rate when stored in a hot and humid environment. Although using lubricants that are not diluted with water in the lubricant distribution system eliminates the problem of compatibility loss arising from alkalinity in the water used to dilute the lubricant (i.e. the water coming out at a filling or packaging plant), the nature of the emulsifiers present in the lubricant composition becomes critical because they are present in the composition at higher concentrations. Accordingly, the presence of emulsifiers, including emulsifiers which are claimed to be "stress crack inhibitors" in lubricant and bottle washing compositions can cause sufficient reduction to the PET compatibility of silicone emulsion based lubricants so that such compositions are unacceptable for use on non-returnable PET carbonated soft drink bottles.

The PET compatibility of lubricant compositions may also be improved by including a stoichiometric amount of an acid. Lubricant compositions comprising a stoichiometric amount of an acid and having improved compatibility with PET are disclosed in patent application Ser. No. 11/233,568, titled SILICONE CONVEYOR LUBRICANT WITH STOICHIOMETRIC AMOUNT OF AN ACID, the entire disclosure of which is incorporated herein by reference in its entirety.

Preferred lubricant compositions may also contain a wetting agent. Lubricant compositions comprising a wetting agent and having improved compatibility with PET are disclosed in patent application Ser. No. 11/233,596, titled SILICONE LUBRICANT WITH GOOD WETTING ON PET SURFACES, the entire disclosure of which is incorporated herein by reference in its entirety. Care should be taken to avoid the use of wetting agents that might promote environmental stress cracking in plastic containers when evaluated using the PET Stress Crack Test set out below.

For applications involving plastic containers, the lubricant compositions preferably have a total alkalinity equivalent to less than about 100 ppm $CaCO_3$, more preferably less than about 50 ppm $CaCO_3$, and most preferably less than about 30 ppm $CaCO_3$, as measured in accordance with Standard Methods for the Examination of Water and Wastewater, 18$^{th}$ Edition, Section 2320, Alkalinity.

A variety of kinds of conveyors and conveyor parts can be coated with the lubricant composition. Parts of the conveyor that support or guide or move the containers and thus are preferably coated with the lubricant composition include belts, chains, gates, chutes, sensors, and ramps having surfaces made of fabrics, metals, plastics, composites, or combinations of these materials.

The lubricant composition can also be applied to a wide variety of containers including beverage containers; food containers; household or commercial cleaning product containers; and containers for oils, antifreeze or other industrial fluids. The containers can be made of a wide variety of materials including glasses; plastics (e.g., polyolefins such as polyethylene and polypropylene; polystyrenes; polyesters such as PET and polyethylene naphthalate (PEN); polyamides, polycarbonates; and mixtures or copolymers thereof); metals (e.g., aluminum, tin or steel); papers (e.g., untreated, treated, waxed or other coated papers); ceramics; and laminates or composites of two or more of these materials (e.g., laminates of PET, PEN or mixtures thereof with another plastic material). The containers can have a variety of sizes and forms, including cartons (e.g., waxed cartons or TETRA-PAK™ boxes), cans, bottles and the like. The lubricant composition preferably contacts only parts of the container that will come into contact with the conveyor or with other containers.

Dispensing Equipment

Preferred dispensing equipment for practice of the present invention includes spraying apparatus that comprises spray nozzles that are non-energized, i.e. they provide a fine lubricant spray at relatively low flow rates (preferably less than about 7.5 gallons/hour at pressures less than about 60 psi) without requiring applied energy (for example high pressure, compressed air, or sonication) to break up the lubricant flow into small droplets. The spray dispensing system operates at relatively lower pressure (preferably less than about 60 psi) and does not comprise either a high pressure lubricant line or a lubricant venting line. Useful droplet sizes for the lubricant spray are from about 100 to about 5000 microns, preferably about 100 to about 500 microns.

Preferred nozzles for the practice of the current invention are small capacity spray nozzles which distribute the liquid lubricant as a solid (full) cone, hollow cone, flat fan or sheet-type of spray at pressures less than about 60 psi. Particularly preferred nozzles are flat spray nozzles with tapering edges which are useful in establishing uniform spray distribution from overlapping spray patterns between adjacent sprays on a multiple nozzle header. Flat spray nozzles useful in the practice of the current invention include elliptical orifice nozzles and deflector nozzles. In the elliptical orifice design, the axis of the spray pattern is a continuation of the axis of the inlet pipe connection. In the deflector design, the deflection surface diverts the spray pattern away from the axis of the inlet pipe connection. Useful flat spray nozzles include FloodJet and VeeJet Small Capacity Wide Spray Angle nozzles (available from Spraying Systems, Wheaton, Ill.), FF Extra Wide Angle and NF Standard Fan nozzles (available from Bete Fog Nozzle, Inc., Greenfield, Mass.), and Flat Spray Standard nozzles (available from Allspray, Inc., Carol Stream, Ill.). A particularly preferred deflector flat spray nozzle is the Low Flow FloodJet 1/8K-SS.25 nozzle available from Spraying Systems, Wheaton Ill. Useful cone spray nozzles include UniJet Small Capacity Standard Spray nozzles (available from Spraying Systems, Wheaton, Ill.), WT Right Angle Hollow Cone nozzles (available from Bete Fog Nozzle, Inc., Greenfield, Mass.), and Hollow Cone Standard nozzles (available from Allspray, Inc., Carol Stream, Ill.). A particularly preferred cone spray nozzle is the UniJetTXVS-1 nozzle available from Spraying Systems, Wheaton Ill.

Dispensing apparatus for practice of the present invention includes means to provide lubricant compositions to nozzles under low to moderate pressures, less than about 60 psi. One possible means is to pressurize the lubricant source. Preferred dispensing equipment includes means to pressurize the lubricant composition in line by pumping. The requirements for a pump are modest and can be met by a variety of pump designs including diaphragm pumps, peristaltic pumps, and valveless rotating reciprocating piston metering pumps. Particularly preferred pumps start and stop automatically when a discharge valve downstream of the pump is opened and closed. In this way, the pump is not operating during non-application periods. Examples of pumps that start and stop automatically include positive displacement diaphragm pumps with built-in pressure switches that automatically start and stop pumping instantaneously when the discharge valve is opened. An example includes a Flowjet 2100 pump available from Flowjet, a division of IIT Industries, Foothill Ranch, Calif. Other examples of pumps that start and stop automatically are positive displacement reciprocating double diaphragm pumps such as the Wilden PI plastic pump available from Wilden Pump & Engineering, LLC, Grand Terrace, Calif. and pneumatic single diaphragm pumps such as the Yamada NDP-5 pump available from Yamada America, West Chicago Ill. Pumps which do not automatically start and stop upon action of a downstream discharge valve may advantageously be used with a controller that actuates both the downstream discharge valve and the pump.

The present invention provides several advantages over the prior art. First, the lubricant compositions have improved PET compatibility due to the selection of PET compatible silicone emulsions. Additionally, in some embodiments, if sufficient water is included in the lubricant composition, the composition can be applied undiluted with simple application equipment (i.e. non-energized nozzles). Applying "neat" or undiluted lubricant compositions can provide drier lubrication of the conveyors and containers, a cleaner and drier conveyor line and working area, and reduced lubricant usage, thereby reducing waste, cleanup and disposal problems. Further, by adding water to the composition and not requiring dilution upon application, problems created by dilution errors and issues with quality of on site water (i.e. microorganisms that can reduce system cleanliness and alkalinity which can lead to environmental stress cracking) are avoided. Intermittent application of the lubricant composition can provide the advantages of reduced lubricant usage, reduced cost, and decreased frequency that the lubricant containers have to be switched.

Methods of Application

The lubricant coating can be applied in a constant or intermittent fashion. Preferably, the lubricant coating is applied in an intermittent fashion in order to minimize the amount of applied lubricant composition. It has been discovered that the present invention may be applied intermittently and maintain an optimum and sufficiently low coefficient of friction in between applications. Specifically, the present invention may be applied for a period of time and then not applied for at least 15 minutes, at least 30 minutes, or at least 120 minutes or longer. The application period may be long enough to spread the composition over the conveyor belt (i.e. one revolution of the conveyor belt). During the application period, the actual application may be continuous, i.e. lubricant is applied to the entire conveyor, or intermittent, i.e. lubricant is applied in bands and the containers spread the lubricant around. The lubricant is preferably applied to the conveyor surface at a location that is not populated by packages or containers. For example, it is preferable to apply the lubricant spray upstream of the package or container flow or on the inverted conveyor surface moving underneath and upstream of the container or package.

In some embodiments, the ratio of non-application time to application time may be 5:1, 30:1, 180:1, and 1000:1 where the lubricant maintains an optimal and low coefficient of friction in between lubricant applications.

Particularly preferred lubricant compositions used in the invention contain greater than about 50%, greater than 65%, and greater than 85% of water or a hydrophilic diluent, as a component or components in the lubricant composition as sold or added just prior to use. The lubricant compositions may contain a silicone material concentration of 0.0015% to 60%, 0.0075% to 20%, and 0.045% to 7%. The lubricant compositions do not require in-line dilution with significant amounts of water, that is, it can be applied undiluted or with relatively modest dilution, e.g., at a water:lubricant ratio of about 1:1, 5:1, or 30:1. Nozzles useful in the practice of the current invention are non-energized and generate a fine lubricant spray at low to moderate pressures between 5 psi and 80 psi, preferably between 20 psi and 60 psi, and have preferably between 30 psi and 50 psi, and deliver between 0.1 gallons/hour and 10 gallons/hour, preferably between 0.25 gallons/hour and 7.5 gallons/hour and more preferably between 0.5 and 5.0 gallons/hour.

In some embodiments, a feedback loop may be used to determine when the coefficient of friction reaches an unacceptably high level. The feedback loop may trigger the lubricant composition to turn on for a period of time and then optionally turn the lubricant composition off when the coefficient of friction returns to an acceptable level.

The present invention is applied in such a way as to provide an acceptable coefficient of friction between the container and the conveyor. In preferred embodiments of the present invention, the coefficient of friction (COF) has different values at different locations on the conveyor line. Proper determination of the coefficient of friction requires that any gravitational component be resolved and subtracted from the force required to keep bottles stationary on a moving track in the case the conveyor track has a tilt perpendicular to the direction of travel. In the case that the conveyor track is tilted, the frictional force is equal to $\cos \theta$ times the measured force, where $\theta$ is the angle between the direction of travel parallel to the horizon and the direction of force measurement. The coefficient of friction at any point on the track should be averaged over at least one lubricant application/lubricant non application cycle. By average coefficient of friction it is meant the coefficient of friction averaged over one cycle of lubricant application/lubricant non-application. Preferred coefficient of friction values for the present invention when measured as discussed above range from about 0.05 to about 0.25. In preferred embodiments of the present invention, the ratio of the coefficient of friction at one portion of the conveyor surface to a second portion of the conveyor surface is greater than 1.05:1.00, greater than 1.10:1.00, and greater than 1.15:1.00.

The methods of the present invention provide a thin layer of lubricant at the interface between package and conveyor surfaces. The lubricant layer may be substantially contiguous or may be discontinuous. The average lubricant coating should be appropriately thick to provide the desired degree of lubrication. The average lubricant coating thickness preferably is maintained at least about 0.00001 mm, more preferably about 0.0001 to about 2 mm, and most preferably about 0.005 to about 0.5 mm.

The lubricant compositions can if desired be evaluated using a Spray Test, a Viscosity Test, a Short Track Conveyor Test, and a PET Stress Crack Test.

Spray Test

The spray test evaluates the capability of lubricant formulations to be dispensed using a non-energized nozzle. According to this test, the test lubricant solution is supplied to a Low Flow FloodJet 1/8K-SS.25 nozzle (available from Spraying Systems, Wheaton Ill.) through a Yamada NDP-5 pump which is pressurized by compressed air. The hydrostatic pressure of the lubricant at the nozzle was varied by adjusting the pressure in the air line pressurizing the Yamada NDP-5 pump, and measured using a gauge next to the nozzle. Using this apparatus, the spray angle of lubricant solutions was determined when the pressure at the nozzle was 40 psi to 110 psi.

Viscosity Test

The lubricant composition viscosity was measured using a Brookfield viscometer with an RV2 spindle at a speed of 20 RPM.

Short Track Conveyor Test

A conveyor system employing two motor-driven REX-NORD™ LF polyacetal thermoplastic conveyor belts 19 cm wide by 6.1 meter long was operated at a belt speed of 30.48 meters/minute. A thin, even coat of the lubricant composition was dispensed to the surface of the belt using a Low Flow FloodJet 1/8K-SS.25 nozzle (available from Spraying Systems, Wheaton Ill.) fed by a Yamada NDP-5 pneumatic single diaphragm pump (available from Yamada America, Inc., West Chicago Ill.) at a delivery pressure of 40 psi for a time of 15 seconds. Four 20 ounce filled PET beverage bottles were lassoed, placed on the conveyor belt and connected to a stationary strain gauge. The force exerted on the strain gauge during belt operation was recorded using a computer. Following the dispensing of the lubricant composition, the belt was allowed to run for 90 minutes during which time the drag force acting on the four bottles was collected. The coefficient of friction (COF) was calculated by dividing the drag force (F) by the weight of the lasso and four 20 ounce filled PET beverage bottles (W): COF=F/W. After 90 minutes without application, the cycle of dispensing lubricant for 15 seconds and not dispensing lubricant for 90 minutes was repeated two more times, using four new 20 ounce filled PET beverage bottles for each cycle. The COF between the bottles and conveyor at the end of the third 90 minute period of not dispensing lubricant was recorded.

Pet Stress Crack Test

Compatibility of lubricant compositions with PET beverage bottles was determined by charging bottles with carbonated water, contacting with lubricant composition, storing at elevated temperatures and humidity for a period of 28 days, and counting the number of bottles that either burst or leaked through cracks in the base portion of the bottle. Standard twenty ounce "Contour" bottles (available from Southeastern Container, Enka N.C.) were charged successively with 557 g of chilled water at 0 to 5 C, 10.6 g of sodium bicarbonate, and 17.1 mL of 50% aqueous solution of citric acid. Immediately after addition of the citric acid solution, the charged bottle was capped and the torque on the bottle cap adjusted to 16 in-lb, and then the bottle was rinsed with deionized water and stored at ambient conditions (20-25 C) overnight. Twenty four bottles thus charged were dipped in lubricant working solution up to the seam which separates the base and sidewall portions of the bottle and swirled for approximately five seconds, then placed in a standard bus pan (part number 4034039, available from Sysco, Houston Tex.) lined with a polyethylene bag. Additional lubricant working solution was not poured into the bus pan so that the total amount of lubricant solution in the pan was that carried into the pan on the bottles. For each lubricant evaluated, a total of 48 to 96 bottles were tested. Immediately after placing bottles and lubricant into bus pans, the bus pans were removed to a humidity chamber under conditions of 100F and 85% relative humidity. Bins were checked on a daily basis and number of failed bottles was recorded. At the end of 28 days, the amount of crazing on the base region of bottles that did not fail during humidity testing was evaluated. A visual crazing score was given to bottles where 0=no crazing is evident, the bottle base remains clear; and 10=pronounced crazing to the extent that the base has become opaque.

EXAMPLES

The invention can be better understood by reviewing the following examples. The examples are for illustration purposes only, and do not limit the scope of the invention.

Comparative Example A

Lubricant Composition from U.S. Pat. No. 6,495,494

A lubricant composition was prepared according to EXAMPLE 2 of U.S. Pat. No. 6,495,494. Dow Corning Corporation HV490 silicone emulsion (2.1 parts), 96 wt. % glycerol solution (77.2 parts) and deionized water (20.7 parts) were combined with stirring until a uniform mixture was obtained. The viscosity of the lubricant solution measured with a Brookfield viscometer using an RV2 spindle at 20 rpm was determined to be 42 centipoises. The lubricant composition was subjected to the spraying test as described above. With a nozzle pressure of 40 psi, the lubricant dispensed from the Low Flow FloodJet 1/8K-SS.25 nozzle in a stream, not a fan spray and the lubricant spray angle was less than 10 degrees. When the pressure at the nozzle was increased to up to 110 psi, the lubricant continued to dispense in a stream and did not dispense in a fan spray pattern. What this comparative example shows is that the lubricant composition of EXAMPLE 2 of U.S. Pat. No. 6,495,494 does not give a useful spray pattern when dispensed with a Low Flow FloodJet 1/8K-SS.25 nozzle at 40-110 psi pressure.

Comparative Example B (Dry Silicone Lubricant which Contains Triethanolamine Dodecyl Benzene Sulfonate, a Triethanolamine Salt of an Alkyl Benzene Sulfonic Acid Compound)

In a first step, a fatty amine solution was prepared by adding 7.5 g of Duomeen OL (available from Akzo Chemicals, Inc. Chicago Ill.), 3.0 g of Duomeen CD (available from Akzo Chemicals, Inc. Chicago Ill.), 4.5 g of Genamin LA 302D (available from Clariant Corporation, Mount Holly, N.C.), 3.0 g of Chemeen C-12G surfactant (available from Chemax, Inc., Greenville, S.C.), 6.4 g of glacial acetic acid, 9.0 g Surfonic TDA-9 surfactant (available from Huntsman Corporation, Houston, Tex.), and 1.8 g of 45% aqueous potassium hydroxide to 63.4 g of softened water. A lubricant solution was prepared which contained 2.0 g of fatty amine solution, 4.0 g of Dow Corning HV-490 silicone emulsion (available from Dow Corning Corporation, Midland, Mich.) and 194 g of deionized water. The lubricant solution was tested for PET compatibility as described above. After 20 days of storage under conditions of 100F and 85% relative humidity, 14 of 96 bottles (15%) had failed. The visual crazing score for the unfailed bottles in this test was 6.7. The content of TEA DDBSA in the Dow Corning HV-490 emulsion was determined by anion electrode titration to be 8.7% and the concentration of TEA DDBSA in the lubricant solution was 1740 ppm. What this comparative example shows is that a substantially aqueous dry silicone lubricant composition which contains 1740 ppm of TEA DDBSA has an unacceptable rate of failure in the PET compatibility test.

Comparative Example C (Dry Silicone Lubricant which Contains Triethanolamine Dodecyl Benzene Sulfonate)

A lubricant solution was prepared which contained 2.0 g of the fatty amine solution of Comparative Example B, 4.0 g of Lambent E-2140 FG silicone emulsion, 5.8 g of a 10% solution of Bio Soft N-300 surfactant solution (Bio Soft N-300 is a 60% aqueous solution of TEA DDBSA available from Stepan, Northfield Ill.), and 188 g of softened water. The lubricant solution contained 1740 ppm TEA DDBSA by formulation. The lubricant solution was tested for PET compatibility as described above. After 28 days of storage under conditions of 100F and 85% relative humidity, 13 of 96 bottles (14%) had failed. The visual crazing score for the unfailed bottles in this test was 8.0. What this comparative example shows is that a substantially aqueous dry silicone lubricant composition which contains 1740 ppm of TEA DDBSA has an unacceptable rate of failure in the PET compatibility test.

Example 1

(Dry Silicone Lubricant which does not Contain Triethanolamine Dodecyl Benzene Sulfonate)

A lubricant solution was prepared which contained 2.0 g of the fatty amine solution of Comparative Example B, 4.0 g of Lambent E-2140 FG silicone emulsion (available from Lambent Technologies Corporation, Fernandina Beach, Fla.) and 194 g of softened water. The viscosity of the lubricant solution measured with a Brookfield viscometer using an RV2 spindle at 20 rpm was determined to be 10 centipoises. The lubricant solution was subjected to the spraying test described above. With a nozzle pressure of 40 psi, the lubricant spray angle was 110 degrees. When tested for lubricity using the Short Track Conveyor Test described above, the COF between the bottles and conveyor at the end of the third 90 minute period of not dispensing lubricant was 0.125. The lubricant solution was tested for PET compatibility as described above. After 28 days of storage under conditions of 100F and 85% relative humidity, 2 of 48 bottles (4%) had failed. The visual crazing score for the unfailed bottles in this test was 5.9. Lambent E-2140 FG silicone emulsion does not contain TEA DDBSA. What this example shows is that a substantially aqueous dry silicone lubricant composition which does not contain TEA DDBSA provides a lower failure rate in the PET compatibility test relative to a silicone lubricant which contains TEA DDBSA.

Example 2

(Dry Silicone Lubricant which Contains less than 40 ppm Triethanolamine Dodecyl Benzene Sulfonate)

A lubricant composition was prepared which contained 2.0 g of the fatty amine solution of Comparative Example B, 2.6 g of Dow Corning HV 600 silicone emulsion (available from Dow Corning Corporation, Midland, Mich.) and 195 g of deionized water. The lubricant composition was tested for lubricity using the Short Track Conveyor Test described above, except that the third period of not dispensing lubricant was 60 minutes instead of 90. The COF between the bottles and conveyor at the end of the third (60 minute) period of not dispensing lubricant was 0.125. The lubricant solution was tested for PET compatibility as described above. After 28 days of storage under conditions of 100F and 85% relative humidity, 0 of 96 bottles (0%) had failed. The visual crazing score for the unfailed bottles in this test was 5.1. The concentration of TEA DDBSA in Dow Corning HV 600 measured by the anion electrode titration method is less than about 0.3%. What this example shows is that a substantially aqueous dry silicone lubricant composition which contains less than about 40 ppm TEA DDBSA provides a lower failure rate in the PET compatibility test relative to a silicone lubricant which contains 1740 ppm TEA DDBSA.

Example 3

(Dry Silicone Lubricant which Contains less than 30 ppm Triethanolamine Dodecyl Benzene Sulfonate)

A lubricant solution was prepared which contained 2.0 g of the fatty amine solution of Comparative Example B, 2.8 g of Dow Corning 1664 silicone emulsion (available from Dow Corning Corporation, Midland, Mich.) and 195 g of deionized water. The lubricant solution was tested for PET compatibility as described above. After 28 days of storage under conditions of 100F and 85% relative humidity, 0 of 96 bottles (0%) had failed. The visual crazing score for the unfailed bottles in this test was 5.2. The concentration of TEA DDBSA in Dow Corning 1664 silicone emulsion measured by the anion electrode titration method is less than about 0.2%. What this example shows is that a substantially aqueous dry silicone lubricant composition which contains less than 30 ppm TEA DDBSA provides a lower failure rate in the PET compatibility test relative to a silicone lubricant which contains 1740 ppm TEA DDBSA.

Example 4

(Dry Silicone Lubricant which Contains less than 30 ppm Triethanolamine Dodecyl Benzene Sulfonate)

A lubricant solution was prepared which contained 2.0 g of the fatty amine solution of Comparative Example B, 2.3 g of GE Silicones SM2169 silicone emulsion (available from GE Silicones, Wilton, Conn.) and 196 g of deionized water. The lubricant solution was tested for PET compatibility as described above. After 26 days of storage under conditions of 100F and 85% relative humidity, 0 of 96 bottles (0%) had failed. The visual crazing score for the unfailed bottles in this test was 7.2. The concentration of TEA DDBSA in GE Silicones SM2169 silicone emulsion measured by the anion electrode titration method is less than about 0.2%. What this example shows is that a substantially aqueous dry silicone lubricant composition which contains less than 30 ppm TEA DDBSA provides a lower failure rate in the PET compatibility test relative to a silicone lubricant which contains 1740 ppm TEA DDBSA.

Example 5

(Dry Silicone Lubricant which Contains 190 ppm of Triethanolamine Dodecyl Benzene Sulfonate)

A lubricant solution was prepared which contained 2.0 g of the fatty amine solution of Comparative Example B, 2.8 g of Dow Corning 1101 silicone emulsion (available from Dow Corning Corporation, Midland, Mich.) and 195 g of deionized water. The lubricant solution was tested for PET compatibility as described above. After 28 days of storage under conditions of 100F and 85% relative humidity, 1 of 72 bottles (1%) had failed. The visual crazing score for the unfailed bottles in this test was 6.1. Dow Corning 1101 silicone emulsion is described as an anionic-nonionic silicone emulsion that contains TEA DDBSA. The concentration of TEA DDBSA in Dow Corning 1101 silicone emulsion was determined to be 1.3% by the anion electrode titration method. The concentration of TEA DDBSA in the lubricant composition was 190 ppm. What this example shows is that a substantially aqueous dry silicone lubricant composition that contains 190 ppm TEA DDBSA provides a lower failure rate in the PET compatibility test relative to a silicone lubricant which contains 1740 ppm TEA DDBSA.

Comparative Example D (Dry Silicone Lubricant which Contains Triethanolamine Dodecyl Benzene Sulfonate)

A lubricant solution was prepared which contained 4.0 g of Lambent E-2140 FG silicone emulsion, 5.8 g of a 10% solution of Bio Soft N-300 surfactant solution (Bio Soft N-300 is a 60% aqueous solution of TEA DDBSA available from Stepan, Northfield Ill.), and 190 g of softened water. The lubricant solution contained 1740 ppm TEA DDBSA by formulation. The lubricant solution was tested for PET compatibility as described above. After 28 days of storage under conditions of 100F and 85% relative humidity, 9 of 96 bottles (9%) had failed. The visual crazing score for the unfailed bottles in this test was 8.0. What this comparative example shows is that a substantially aqueous dry silicone lubricant composition which contains 1740 ppm of TEA DDBSA has an unacceptable rate of failure in the PET compatibility test.

Example 6

(Dry Silicone Lubricant which does not Contain Triethanolamine Dodecyl Benzene Sulfonate)

In a first step, a fatty amine solution was prepared by adding 10.0 g of Duomeen OL (available from Akzo Chemicals, Inc. Chicago Ill.), and 3.6 g of glacial acetic acid to 86.4 g of deionized water. A lubricant solution was prepared which contained 50.0 g of the fatty amine solution, 50.0 g of Lambent E-2140 FG silicone emulsion, and 5.0 g of Surfonic L24-7 surfactant (available from Huntsman LLC, Houston, Tex.) and 895 g of deionized water. The lubricant solution was tested for PET compatibility as described above. After 28 days of storage under conditions of 100F and 85% relative humidity, 0 of 48 bottles (0%) had failed. Lambent E-2140 FG silicone emulsion does not contain TEA DDBSA. What this example shows is that a substantially aqueous dry silicone lubricant composition which does not contain TEA DDBSA provides a lower failure rate in the PET compatibility test relative to a silicone lubricant which contains TEA DDBSA.

The foregoing summary, detailed description, and examples provide a sound basis for understanding the invention, and some specific example embodiments of the invention. Since the invention can comprise a variety of embodiments, the above information is not intended to be limiting. The invention resides in the claims.

What is claimed is:

1. A method for lubricating the passage of a container along a conveyor comprising applying a lubricant composition through non-energized nozzles to at least a portion of the container-contacting surface of the conveyor or at least a portion of the conveyor-contacting surface of the container, the lubricant composition comprising a silicone emulsion, wherein the lubricant composition contains less than about 500 ppm of triethanolamine salts of alkyl benzene sulfonic acid compounds.

2. The method of claim 1, wherein the silicone emulsion includes emulsifiers other than triethanolamine salts of alkyl benzene sulfonic acid compounds.

3. The method of claim 1, wherein the silicone emulsion includes emulsifiers selected from the group of linear alkyl phenol ethoxylates, branched alkyl phenol ethoxylates, linear primary alcohol ethoxylates, branched primary alcohol ethoxylates, linear secondary alcohol ethoxylates, branched secondary alcohol ethoxylates, poly alkylene oxide modified polydimethylsiloxanes, sorbitan derivatives, sodium alkyl aryl polyether sulfonate compounds, sodium alkyl aryl sulfonate compounds trim ethyl ammonium salts, and mixtures thereof.

4. The method of claim 1, wherein the lubricant composition comprises:
   a. from about 0.0015 to about 50 wt. % of a silicone material; and
   b. from about 50 to about 99.999 wt. % water.

5. The method of claim 1, wherein the viscosity of the lubricant composition is less than about 40 centipoises when measured using a Brookfield viscometer with an RV2 spindle at a spindle speed of 20 RPM.

6. The method of claim 1, wherein the lubricant is applied from a spray nozzle at a pressure of between 5 and 80 psi.

7. The method of claim 1, wherein the lubricant composition is on for a period of time and off for a period of time and the ratio of off time to on time is at least 5:1.

8. The method of claim 1, wherein the lubricant has less than 5% failure when measured using the PET compatibility test.

9. The method of claim 1, wherein the composition maintains an average coefficient of friction of between about 0.05 and 0.25 over the entire period of use.

10. The method of claim 1, wherein the lubricant composition is not diluted prior to spraying.

11. The method of claim 1, wherein the lubricant composition is diluted in line prior to use with a ratio of lube concentrate to water equal to between 115 and 111 000.

12. The method of claim 1, wherein the lubricant composition is substantially free of triethanolamine salts of alkyl benzene sulfonic acid compounds.

13. The method of claim 1, wherein the lubricant composition is substantially free of an anionic surfactant.

14. The method of claim 1, wherein the lubricant composition further comprises an additional functional ingredient selected from the group consisting of water miscible lubricants, hydrophilic diluents, antimicrobial agents, stabilizing/ coupling agents, detergents and dispersing agents, anti-wear agents, viscosity modifiers, sequestrants, corrosion inhibitors, film forming materials, antioxidants, antistatic agents and mixtures thereof.

15. The method of claim 1, wherein the lubricant composition further comprises a water-miscible lubricant selected from the group consisting of a phosphate ester, an amine, an amine derivative, and mixtures thereof.

16. The method of claim 1, wherein the lubricant composition is applied to a first portion of the conveyor and maintains a first coefficient of friction and a second portion of the conveyor and maintains a second coefficient of friction and the first coefficient of friction and the second coefficient of friction are not the same.

17. The method of claim 1, wherein the alkyl benzene sulfonic acid is dodecyl benzene sulfonic acid.

18. A method for lubricating the passage of a container along a conveyor comprising applying an undiluted lubricant composition through non-energized nozzles to at least a portion of the conveyor, the lubricant composition comprising a silicone emulsion selected from the group consisting of Lambent Technologies E2175 emulsion, Lambent Technologies E2140 emulsion, Lambent Technologies E2140FG emulsion, Dow Corning HV600 emulsion, Dow Corning 1664, Dow Corning 1101 emulsion, Dow Corning 346 emulsion, General Electric SM 2068A emulsion, General Electric SM 2128 emulsion, General Electric SM 2135 emulsion, General Electric SM 2138 emulsion, General Electric SM 2140 emulsion, General Electric SM 2154 emulsion, General Electric SM 2162 emulsion, General Electric SM 2163 emulsion, General Electric SM 2167 emulsion, General Electric SM 2169 emulsion, General Electric SM 2725 emulsion, Shin-Etsu KM 901 emulsion, Shin-Etsu KM 902 emulsion, Wacker Fluid Emulsion E10, Wacker Fluid Emulsion E1044, and mixtures thereof, and a water-miscible lubricant, the lubricant composition having a viscosity of less than 40 centipoise when measured using a Brookfield viscometer with an RV2 spindle at a spindle speed of 20 RPM and the lubricant composition being substantially free of a triethanolamine salt of dodecyl benzene sulfonic acid.

19. The method according to claim 18, wherein the lubricant has less than 5% failure when measured using the PET compatibility test.

* * * * *

UNITED STATES PATENT AND TRADEMARK OFFICE
CERTIFICATE OF CORRECTION

| | | |
|---|---|---|
| PATENT NO. | : 7,745,381 B2 | |
| APPLICATION NO. | : 11/351863 | |
| DATED | : June 29, 2010 | |
| INVENTOR(S) | : Valencia Sil et al. | |

It is certified that error appears in the above-identified patent and that said Letters Patent is hereby corrected as shown below:

Title page, Item (57) Abstract: delete incorrect Abstract and replace with the following:

--The passage of a container along a conveyor is lubricated by applying to the container or conveyor a lubricant composition comprising a water-miscible silicone material having a silicone emulsion wherein the silicone emulsion contains less than 500 ppm of a triethanolamine salts of alkyl benzene sulfonic acid compounds.--

Title Page 2, Item (56) Other Publications: insert --Henkel Ecolab, "*Conveyor Lubrication*", 27 Food Ireland, 1 page—and "*Maintaining hygiene on filler line conveyor track*", Packing Hygiene, 2 pages-- in appropriate order Col. 20, line 58, claim 11: "between 115 and 111 000." should read --between 1/5 and 1/1000.--

Col. 21, line 18 to Col. 22, line 18, claim 18: delete incorrect claim and replace with the following:

--18.    A method for lubricating the passage of a conveyor comprising applying an undiluted lubricant composition through non-energized nozzles to at least a portion of the conveyor, the lubricant composition comprising a silicone emulsion and a water-miscible lubricant, the lubricant composition having a viscosity of less than 40 centipoise when measured using a Brookfield viscometer with an RV2 spindle at a spindle speed of 20 RPM and the lubricant composition being substantially free of a triethanolamine salt of dodecyl benzene sulfonic acid.--

Signed and Sealed this
Thirteenth Day of September, 2011

David J. Kappos
*Director of the United States Patent and Trademark Office*